Nov. 13, 1923.　　　　　　　　　　　　　　　　　　1,473,798
C. F. SPEIDEL
STYLUS ATTACHMENT FOR CAMERAS
Filed Aug. 16, 1922
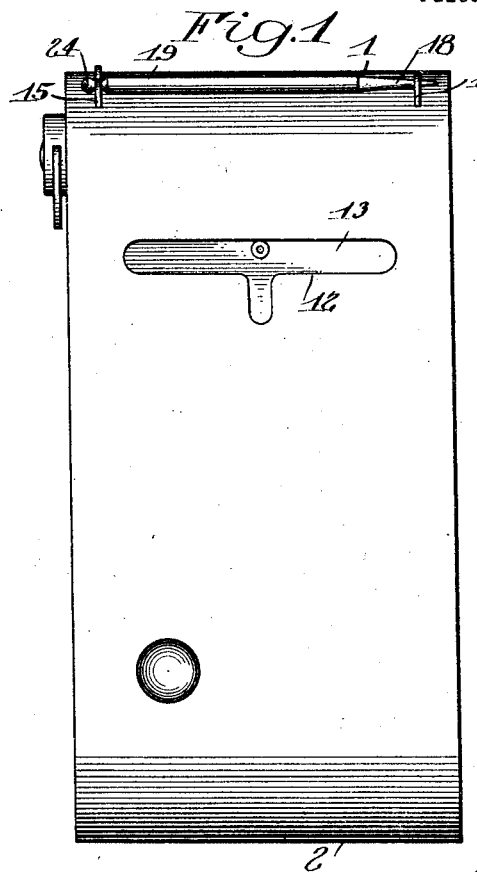
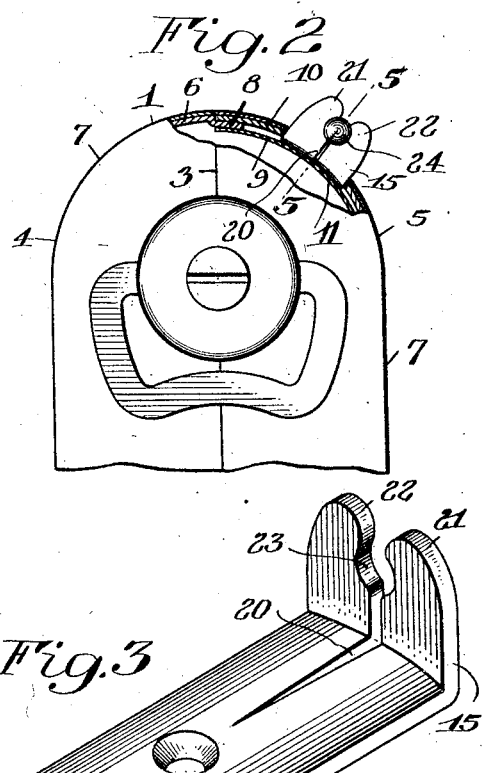
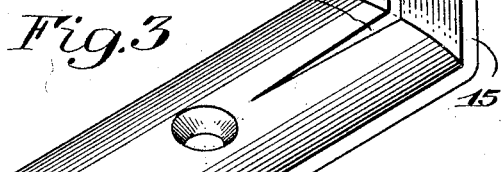
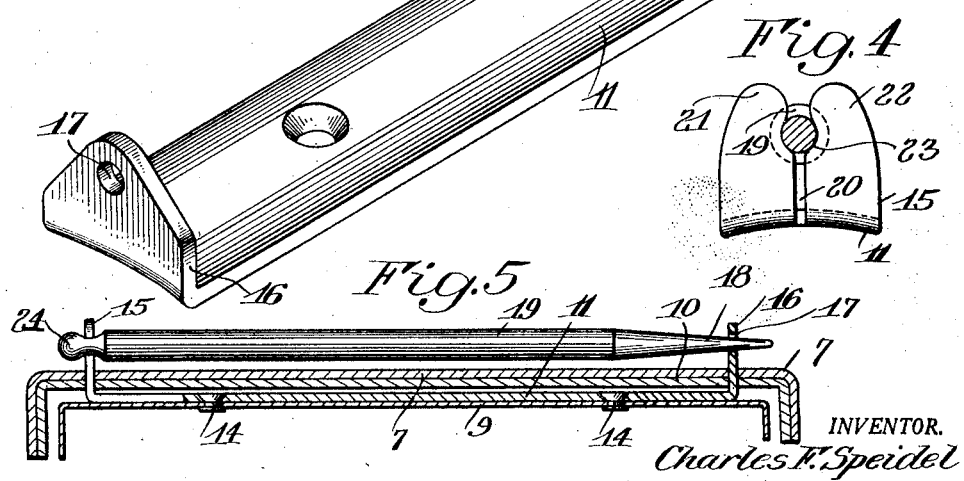
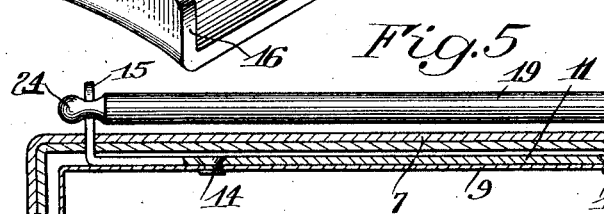
INVENTOR.
Charles F. Speidel
BY
his ATTORNEY Patented Nov. 13, 1923.

1,473,798

UNITED STATES PATENT OFFICE.

CHARLES F. SPEIDEL, OF ROCHESTER, NEW YORK, ASSIGNOR TO EASTMAN KODAK COMPANY, OF ROCHESTER, NEW YORK, A CORPORATION OF NEW YORK.

STYLUS ATTACHMENT FOR CAMERAS.

Application filed August 16, 1922. Serial No. 582,123.

*To all whom it may concern:*

Be it known that I, CHARLES F. SPEIDEL, a citizen of the United States, residing at Rochester, in the county of Monroe and State of New York, have invented certain new and useful Improvements in Stylus Attachments for Cameras; and I do hereby declare the following to be a full, clear, and exact description of the same, reference being had to the accompanying drawings, forming a part of this specification, and to the reference numerals marked thereon.

My present invention relates to photography, and more particularly to photographic cameras of the type in which the sensitive element is made accessible from the exterior of the camera body for the purpose of light printing an inscription thereon, and the invention has for its object to provide a simple, convenient and efficient means for supporting upon the camera a stylus that may be used for inscription purposes. The improvements contemplate an adaptation of the camera body and stylus holder to each other whereby the leakage of light around the stylus holder connections is prevented. To these and other ends the invention consists in certain improvements and combinations of parts, all as will be hereinafter more fully described, the novel features being pointed out in the claims at the end of the specification.

In the drawings:

Figure 1 is a rear view of a folding pocket camera constructed in accordance with and illustrating one embodiment of my invention;

Figure 2 is an enlarged fragmentary side view thereof partly in section;

Figure 3 is a perspective view of the stylus holding bracket attached and enlarged;

Figure 4 is an end view of the said bracket with the stylus shown in cross section, and Figure 5 is a longitudinal section through the stylus bracket and adjacent portions of the camera body on the line 5—5 of Figure 2.

Similar reference numerals throughout the several views indicate the same parts.

My improvements are particularly applicable to folding pocket cameras of the type illustrated which are of thin elongated shape with rounded ends 1 and 2 of semi-cylindrical form developed by the meeting on a median line 3 of a body portion 4 and a back 5, so termed for convenience although the whole structure is, in effect, a two-part camera body. The body portion 4 preferably consists of a metal shell 6 covered with leather 7 and terminating at its edges in flanges 8 offset inwardly to provide one element or blade of a light seal. The back 5 I form of a double shell similarly covered with leather 7 but consisting of inner and outer nested flanged plates 9 and 10. The rounded end flanges of these plates are struck on different radii, the inner being on the shorter radius so that they are spaced apart at this point and constitute a pair of separated blades or flanges that provide the other element of the light seal, the flange 8 on the body being received between them so that the back and body may be separated or brought together on the dividing line 3 in the customary way.

The nested plates 9 and 10 are elsewhere suitably fixed to each other but the narrowing space between them I utilize for the reception and attachment of a stylus holding bracket 11, the back of the camera being provided with an opening 12 and door 13 for inscription purposes. This bracket comprises a body portion lying transversely between the plates and preferably secured to the inner one 9 as by the rivets 14 shown in Figure 5. The ends thereof are bent outwardly to form arms 15 and 16 which pass through suitable perforations in the outer plate 10 and in the leather covering 7 so that they project as shown in Figures 1 and 5. Attention is called to the fact that the rivets 14 and the flanges 15 and 16 are out of alinement so that should a minute light opening be left around either of the rivets the plate 10 will cover it and prevent the entrance of light while should light opening be left adjacent to the arms 15 and 16 the light would be blocked by the inner plate 9, and should openings appear at both points the passage of the light would have to be so tortuous as to be impossible.

The arm 16 is provided with an opening 17 for the longitudinal insertion of the point 18 of a stylus 19, while the other arm 15 is split at 20 to provide two spring jaws 21 and 22 having a rounded seat 23 between them so that the neck of a knob 24 or other reduced portion at the other end of the stylus can be inserted laterally between the jaws and yieldingly held there by their spring grip. To remove the stylus for use this end is unseated laterally from between them by upward pressure of the knob and the point 18 thereafter withdrawn longitudinally from the opening 17.

I claim as my invention:

1. The combination with a two part camera body, one of said parts embodying a pair of nested flanged plates secured together but having their flanged portions spaced apart to provide a light seal element for receiving a flange on the other body part, of a stylus holding bracket having a body portion secured between said spaced flanges and arms extending through the outer plate.

2. The combination with a two part camera body, one of said parts embodying a pair of nested flanged plates secured together but having their flanged portions spaced apart to provide a light seal element for receiving a flange on the other body part, of a stylus holding bracket having a body portion arranged between the spaced flanges and riveted to the inner one and provided with arms extending through the outer plate.

3. The combination with a camera body wall, of a stylus holding bracket comprising a body portion strap secured to said wall and having upturned end portions, one of which is provided with an opening for the longitudinal insertion of the stylus point and the other of which is split to constitute two spring jaws for the lateral insertion of the stylus handle.

CHARLES F. SPEIDEL.